Aug. 24, 1954
L. PARKER
2,686,954
METHOD OF FORMING SILICA TEXTILE MATERIALS
Filed Dec. 19, 1949
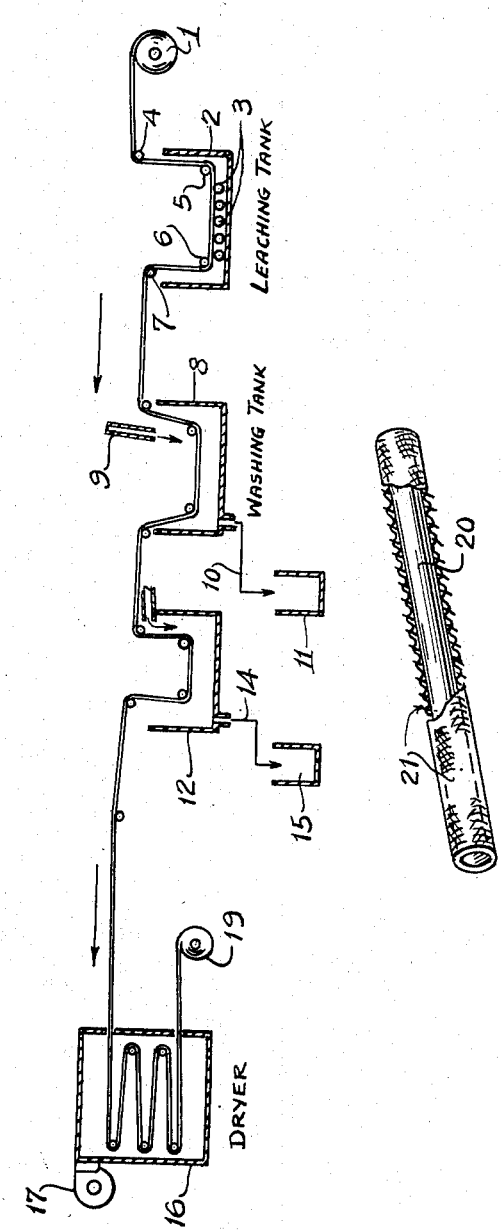
INVENTOR.
Leon Parker
BY
ATTORNEY.

Patented Aug. 24, 1954

2,686,954

UNITED STATES PATENT OFFICE 2,686,954

METHOD OF FORMING SILICA TEXTILE MATERIALS

Leon Parker, Burbank, Calif., assignor to The H. I. Thompson Company, Los Angeles, Calif., a corporation of California Application December 19, 1949, Serial No. 133,895

8 Claims. (Cl. 28—75)

The subject matter not claimed in this application is claimed in application Serial No. 109,206, filed August 8, 1949, now Patent No. 2,624,658.

This invention relates to a method of weaving, knitting, braiding, cording, or otherwise forming textile materials such as cloth, tape, or cord, or other textile materials formed of interlaced silica fibers.

As is now generally known, silica fibers may be formed from glass fibers by leaching, from such fibers, the metallic oxides, other than silica. Depending upon the nature of the glass, these oxides may be removed by acids or even by plain water. When these fibers are dehydrated by firing, silica fibers of high purity in excess of 90% and even 99+% silica may be formed.

It has been shown that glass fibers may be leached to remove the non-siliceous oxides and thus produce fibers of high silica content, the silica content depending upon the degree of extraction of the fibers. Depending upon the composition of the fibers, these non-siliceous oxides may be extracted either by plain water or with acids. While glass fibers of various compositions may be so extracted by both neutral water and acid waters, the boro-silicate glasses, which are usually employed in forming glass filaments for weaving into textile materials which have less than 70% silica content, may be extracted without previous preheating of the glass structure. Such filaments may be leached without such heat treatment and since they are usually of less than .001" in diameter, they may be leached to remove the acid soluble oxides other than silica without destruction of the fiber. The glasses which lend themselves best to drawing into fiber contain about 56% or less of silica, about 22% or less of alumina, about 5% or more of boron oxide and about 22% or less of second group metal oxides, especially lime and magnesia. Such fibers, without preheating, may be readily leached with acid to remove the metal oxides other than silica.

The resultant product contains some water of hydration in the neighborhood of about 8% to 11% and may be dehydrated by heating to temperatures of about 1000° F., preferably in the region of about 1400° to 1600° F. By proper control of the acid extraction process the resultant fibers after firing contain high silica content and may be as high as 90% and even substantially 99.9% of silica as determined by the hydrofluoric acid method.

The above process and the effect of the glass composition and degrees of treatment in producing such extracted glass fibers are described in the Parker and Cole application, Serial No. 669,098, filed May 11, 1946 now Patent No. 2,491,761, and United States Patent No. 2,461,841 issued to Nordberg, to which reference may be had for a more full discussion of this process.

The fired fibers are, however, brittle and their tensile strength and abrasion are but a small fraction of the tensile strength and abrasion resistance of the original glass fibers. They can be woven or formed into textiles only with the greatest of difficulties. It is for such reason that the formation of silica textiles has been restricted to first forming the textile from the glass fibers and then leaching the formed textile and firing the leached textile.

I have now found that I can employ leached fibers preferably in the form of yarn in the textile forming operation and need not first form the textile if I employ such fibers in the unfired state. I have discovered that the leached hydrous (unfired) silica fibers after leaching and before firing have a sufficiently higher tensile strength and abrasion resistance so that, particularly when lubricated, they may be handled by conventional textile machinery, looms, knitting, braiding, cording, or other machinery in the same manner as glass of other textile fibers.

I have thus found that if I extract the fibers to remove the metallic oxides, other than silica, to a degree that the ratio of silica ($SiO_2$) to metallic oxides, other than silica, is in excess of 9:1 and higher, for example, 99:1, I may form these fibers into a fabric by ordinary production machinery, and after such formation into a textile, the textile may be fired to dehydrate the silica textile.

I may and preferably do coat the extracted fibers in the form of yarn before forming them into a textile in order to assist the textile forming operation. The following observations illustrate my discovery:

A sample of glass fiber yarn was leached with 12% HCl and at 140° F. for one hour and washed chloride free with distilled water. Ten strands of yarn were tested in a Scott Tester for tensile strength in the manner described below and the tensile strength for the ten strands had an average value of about thirty pounds or three pounds per strand. When tested for abrasion in the manner described above the abrasion index was about 70. When the fiber was dehydrated by firing at 1200° F. for five minutes its tensile strength was reduced to 1.8 lb./strand. When fired at 1800° F. for five minutes it was reduced to 1.1 lb./strand and its abrasion index was reduced to an average value of 13.

It appears, therefore, that the firing materially reduces the abrasion resistance of tensile strength of the fiber.

I find it desirable to form the textile from the hydrated unfired leached fiber and if desired dehydrate the textile. While this procedure will show improved results over the use of the dehydrated silica fiber in forming textiles, the abrasion resistance is still very low and creates difficulties in the textile forming operations.

I have found, however, that the application of wax or organic polymers, both synthetic and natural, as coating to the leached yarn increases the abrasion resistance of the fibers so materially that the forming of the leached but hydrated fiber into textile material is facilitated. The breakage of threads is so largely reduced as to make the forming of silica threads into textiles practicable.

I have observed that the extracted glass fiber yarn formed of filaments contains large numbers of ends of individual filaments which under the microscope are seen to protrude from the surface of the yarn. When the fiber is flexed, these ends are broken off. The filaments which rest on each other become abraded and broken. The organic material coats the individual filaments with a smooth lubricant surface and also acts to fill the interstices between the filaments, causing the individual filament ends to mat down and be encased in the coating. For such purpose I prefer to employ a material which is non-fluid at ordinary atmospheric temperatures, i. e., less than about 100° F. The result is a densification of the yarn and the presentation of a smooth lubricating surface to the yarn and to the individual filaments thereof.

I believe the above explanation to be true, but whatever the explanation I have found that if I coat the yarn with an organic coating composition, yielding a smooth lubricant surface, an improvement is obtained. The yarn is greatly improved in abrasion resistance.

It is also desirable, in order to obtain desirable physical characteristics for the fibers in the unfired state, where the coating agent is used as a water dispersion, to employ such coating agents and water dispersion which are low in or do not contain metallic cations. Such cations tend to exchange with the hydrated silica structure so as to increase the non-siliceous oxide content of the fired silica fiber and tend to impair its physical characteristics.

Additionally, if the deposited organic coating material is composed of or contains metallic cations, it will, on firing, be burned to the oxide of the cations, which will have a fluxing action on the silica and affect the physical characteristics of the fiber.

I prefer, therefore, to employ organic coatings which are substantially free of metallic elements either as cations or as a part of a more complex radical.

The following data illustrate the effect of such coating on the abrasion resistance of fibers:

Fiber such as referred to above was extracted under the conditions previously described. The unfired yarn had an abrasion index of 79.5. It was dipped into the following solution:

(1) A blend of vegetable and mineral waxes dispersed in water (WE#3030, manufactured by S. C. Johnson & Son, Inc., Racine, Wisconsin), 550 grams in 15 gallons of water. The fiber was dried at 95° C. and showed an abrasion index of 313.

(2) A dispersion of 1 gram of polyvinylacetate resin having a softening point of about 171° F. (AYAF resin sold by the Bakelite Corp.) in 50 cc. of methyl ethyl ketone was employed. The yarn was dried at 65° C. The abrasion index was 280.

(3) A dispersion of 1 gram of polyethylene polymers (polythene) in 100 cc. of xylol was employed; yarn dried at 200° F.; abrasion index average 378. When 2 grams of polyethylene were employed in 100 cc. of xylol and dried at 95° F., the abrasion index was 423 average.

(4) A natural rubber latex dispersion was diluted with water, 1 part latex, 2 parts water coagulated with salt in presence of the yarn; yarn dried, abrasion index average was 588.

(5) Two grams Arochlor 5442 in 100 cc. M. E. K.; yarn dipped and dried; the average abrasion index was 319. The Arochlor 5442 is a chlorinated polyphenyl manufactured by Monsanto Chemical Co., and is a yellow, transparent, sticky resin, 48.5° C. softening point, 247° C. flash point (Cleveland open cut, sp. gr. 1.4548, vis. 313.5 Saybolt seconds).

The large increase in resistance to abrasion by the coatings is clear from the above data.

In leaching the fibers I prefer to employ acid and particularly HCl acid and to control the rate and degree of extraction to obtain maximum tensile strength and abrasion resistance. In previous applications filed by Leon Parker and Bonnie Jean Zack, Serial No. 74,935, February 7, 1949, and now abandoned, and Serial No. 109,206, filed August 8, 1949, it has been shown that in extracting glass fibers with HCl acid there is a transformation of the silica of the glass from a form which is substantially insoluble in sodium carbonate solution into a form which is insoluble in sodium carbonate solution. It is also shown that the percentage of the silica which is present in such soluble form depends upon the degree of extraction to which the glass has been subjected. The glass structure, that is the fiber, maintains its form during the extraction and during the firing, but there is a large impairment in the cohesive force of the fiber structure. Thus, the tensile strength and the resistance to abrasion of the extracted glass fibers of yarn, rope, or cloth is materially reduced, in fact, to but a small fraction of the original tensile strength or abrasive resistance.

The degree of extraction of the non-siliceous oxides of the glass depends upon the time, temperature and concentrations employed, and by controlling these factors the degree of extraction may be controlled.

There is, however, an unexpected reversal in the depreciation of tensile strength as the leaching progresses and as more non-siliceous oxides are extracted; that is, as the concentration of the sodium carbonate soluble silica in the glass increases. Thus, as the leaching progresses and there is a conversion of a portion of the vitreous silica (which is insoluble in sodium carbonate solution) into the sodium carbonate soluble form, the tensile strength of the fiber structure is rapidly decreased, but as the leaching continues and the concentration of carbonate soluble silica in the leached glass increases there is a reversal in the trend and the tensile strength increases as the content of sodium carbonate soluble silica increases, but if this leaching continues with a further increase in the content of the sodium carbonate soluble silica there is a further reversal in the trend and the tensile strength again depreciates.

It was found that the value of the maximum of tensile strength obtained by carrying the extraction of the glass to develop a soluble silica content within the range of 70% to 87%, depends upon the rate of attack of the glass structure by the acid. It was found that the maximum tensile strength is obtained if the development of sodium carbonate soluble silica in the leached glass is at a rate within the range of about 1 to 2.5% (on a volatile free basis) per minute. If the rate is controlled within these limits, then the maximum tensile strength is obtained. It has thus been found that at any given rate of attack a maximum tensile strength is developed when the leaching is controlled to give a leached glass containing soluble silica in the range of 70% to 86% (on a volatile free basis), but the magnitude of the maximum is greatest if the rate of attack is within the limits given. It has also been found that the development of abrasion resistance parallels that of tensile strength. Thus by controlling the rate of attack to within the said limits of 1% to 2.5% of sodium carbonate soluble silica per minute, the maximum abrasion resistance is obtained if the leaching is controlled to produce a leached glass having soluble silica in the range of 70% to 87% (on a volatile free basis).

It was thus found that in order to develop a leached glass structure of maximum tensile strength and maximum abrasion resistance, it is desirable to control the conditions of treatment to obtain a rate of attack to develop sodium carbonate soluble silica in the leached glass structure at the rate of about 1% to 2.5% per minute and to continue the attack to develop a content of sodium carbonate soluble silica in the glass structure in the range of about 70% to 87% of the leached glass.

The leached fibers may be woven, braided, corded or knitted or otherwise formed into textile materials using conventional textile machinery. The fibers show improved results in such procedure if after leaching they are coated with one of the above coating agents. After forming into the textile material, the textile may be heated to a high temperature of 1200 to 2000° F. for a short period to dehydrate and shrink the fiber. Shrinkage of about 5–15% in linear dimension occurs. However, for many uses the textile need not be fired and used in the dry but hydrated form, i. e., unfired.

While many forms of textiles may thus be made, one of the most useful applications of my process is in the continuous braiding of electrical conductors to form a braided sleeve of silica around such conductors. It is conventional to form such sleeving of glass fibers but where the service is above the softening or melting point of the glass, such fibers may not be employed.

Silica fibers are particularly useful in forming such sleeving where high temperatures are to be encountered. They have a melting point in excess of 2000° F. and as high as 3000° F., and will maintain the insulating sheath for the metallic conductor when exposed to such high temperatures. Because I can prepare silica fibers which are suitable for weaving or braiding operations I can utilize conventional machinery for forming a sleeve. Such machinery is adaptable to weaving said sleeve around the wire continuously. The braided wire may then be fired to dehydrate the silica sleeve. The sleeve shrinks when this is accomplished. It is thus advisable to allow for such shrinkage in forming the sleeving. However, for most uses the sleeving need not be fired, since when exposed to high temperatures, as in the case of a fire, the fabric may then become dehydrated.

This invention will be further described by reference to the following drawing, in which Fig. 1 is a schematic flow sheet of the process;
Fig. 2 illustrates the wire with the sleeving.

The process consists of leaching the fiber glass yarn with a leaching solution the composition of which depends on the nature of the glass, as is described in the Nordberg Patent No. 2,461,841, and in the above mentioned applications. It may be water or it may be an acid in which the metallic oxides are soluble. It may thus be $HNO_3$, acetic acid, trichlor acetic acid or HCl acid.

Thus fibers are wound on reels, tabs, or bobbin 1 and mounted for rotation. The yarn is passed through a leaching tank 2 containing, for example, 7–20%, for example, 12%, HCl. The temperature may be controlled in the range of about 100–200° F., for example, 140° F. The time of treatment may vary from about 5 minutes to 1 hour, for example, 10 minutes. The time and temperature are controlled so that the content of soluble silica is within the range indicated above and the rate of attack is as indicated above to develop the maximum tensile strength and abrasion resistance in the fired fiber. Thus heating elements 3 in tank 2 may control the temperature and the speed at which the yarn passes through the tank over rolls 4 to 7 will control the time of contact. The fiber then passes through a trough 8 wherein it is washed with water entering through 9 until substantially chloride free, the pH of the final wash water discharging from 10 into collecting basin 11, being on the acid side about 6 pH. The fiber is then dried at a temperature of about 180° F. by passing through the drying oven 16, aided if desired, by an exhaust attached to 17 which may be made to be part of a solvent recovery system, and wound on bobbins 19 which rotate at the same speed as the reel 1.

The leached, washed, and dried fiber (but not fired) is then formed into textile material, as, for example, by continuous weaving around a wire 20 to form a sleeving 21. This may be the final product, that is, without firing. Such an article of manufacture when exposed to a sufficiently high temperature will dehydrate and the fabric will shrink around the wire but will not melt or soften at temperatures below about 2000–3000° F.

I have found, as stated above, that I can improve the abrasion resistance by coating the fiber. Thus, a tank 12 may be provided in which the coating solution such as described above may be employed. I prefer for making sleeving to use a material which is not highly flammable. Such a material is the Arochlor 5442 and the polyvinyl chloride, polyvinyl chloride copolymers and the wax referred to above. It is introduced through inlet 13 into tank 12 through which the yarn passes. The overflow is removed from outlet 14 into tank 15 for re-use.

The Scott machine used for testing the tensile strength was employed as follows: Ten strands of the yarn, 10" in length, 6" space between jaws, were bunched and the ends of the yarn wrapped with a pressure sensitive tape. The Scott tester was Model No. DH, front jaws 1", back jaws 3", pulling speed 10" per minute. Load is measured in pounds.

The abrasion index was determined by hanging a weight of 100 grams on a single strand, the ends of which were covered with pressure sensitive adhesive, and pulling the strand over a polished roller ¼" in diameter; the stroke was 2¼", the abrasion index being the number of complete (back-forth) cycles before breaking.

While I have described a particular embodiment of my invention for the purpose of illustration, it should be understood that various modifications and adaptations thereof may be made within the spirit of the invention as set forth in the appended claims.

I claim:

1. A method for forming silica textiles, which comprises leaching glass fibers to remove the metallic oxides, other than silica, from the glass fibers, thereafter coating said fibers with a lubricant, and then forming said leached fibers into textile materials.

2. A method for forming silica textiles, which comprises leaching glass fibers to remove the metallic oxides, other than silica, from the glass fibers to form a fiber in which the ratio of $SiO_2$ to other metallic oxides is in excess of about 9:1, thereafter coating said fibers with a lubricant and then forming said leached fibers into textile materials.

3. A method of forming textiles, which comprises forming silica yarn, by leaching glass fibers to remove metallic oxides from the glass, thereafter coating said leached glass fibers with an organic lubricant coating, non-fluid at ordinary atmospheric temperatures, and thereafter interlacing said yarn into textile material.

4. A method of forming textiles, which comprises forming silica yarn by leaching glass fibers to remove metallic oxides from the glass to form a fiber in which the ratio of $SiO_2$ to other metallic oxides is in excess of about 9:1, thereafter coating said leached glass fibers with an organic lubricant coating, non-fluid at ordinary atmospheric temperatures, and then interlacing said yarn into textile material.

5. The method of claim 3 in which the lubricant is wax.

6. The method of claim 4 in which the lubricant is wax.

7. The method of treating glass fibers which comprises leaching the same in an hydrochloric acid bath containing 7% to 20% acid, at a temperature of 100–200° F. for from 5 minutes to one hour, washing the fibers to render the same substantially chloride free, and coating the fibers with a lubricant.

8. The method of forming textiles which comprises treating glass fibers by the method of claim 7 and forming said leached fibers into textile materials by interlacing said fibers to form such textiles.

References Cited in the file of this patent

UNITED STATES PATENTS

| Number | Name | Date |
| --- | --- | --- |
| 2,133,183 | Baird et al. | Oct. 11, 1938 |
| 2,184,320 | Simpson | Dec. 26, 1939 |
| 2,261,148 | Ebaugh | Nov. 4, 1941 |
| 2,263,217 | Lillie et al. | Nov. 18, 1941 |
| 2,323,684 | Simison | July 6, 1943 |
| 2,491,761 | Parker | Dec. 20, 1949 |

OTHER REFERENCES

Refrasil: Reprint from the December 1948 issue of Chemical Engineering Progress, vol. 44, No. 12, page 1. (Copy in Div. 67).